US006718694B2

(12) United States Patent
Stojc et al.

(10) Patent No.: US 6,718,694 B2
(45) Date of Patent: Apr. 13, 2004

(54) DRIVE NUT ASSEMBLY FOR A DOOR OPERATOR

(75) Inventors: Andre Stojc, Ile Bazard (CA); Erich Stephen, Roxboro (CA)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/128,099

(22) Filed: Apr. 23, 2002

(65) Prior Publication Data
US 2002/0194783 A1 Dec. 26, 2002

Related U.S. Application Data
(60) Provisional application No. 60/288,843, filed on May 5, 2001.

(51) Int. Cl.[7] ............................................. E05F 11/34
(52) U.S. Cl. ............................................. 49/362; 49/118
(58) Field of Search ........................... 49/116, 118, 360, 49/362, 280

(56) References Cited

U.S. PATENT DOCUMENTS

| 4,605,108 | A | * | 8/1986 | Monot | ........................ | 49/362 |
|---|---|---|---|---|---|---|
| 5,893,236 | A | * | 4/1999 | Krbec et al. | ........................ | 49/118 |
| 6,009,668 | A | * | 1/2000 | Reddy | ........................ | 49/280 |
| 6,032,416 | A | * | 3/2000 | Springer et al. | ........................ | 49/119 |
| 6,094,867 | A | * | 8/2000 | Reddy | ........................ | 49/280 |
| 6,134,838 | A | * | 10/2000 | Reddy | ........................ | 49/362 |
| 6,446,389 | B1 | * | 9/2002 | Heffner et al. | ........................ | 49/280 |

FOREIGN PATENT DOCUMENTS

JP 4-228788 * 8/1992

* cited by examiner

Primary Examiner—Jerry Redman
(74) Attorney, Agent, or Firm—James Ray & Associates

(57) ABSTRACT

The present invention teaches a powered door operator for passenger transit vehicles having a drive nut assembly engaging a door hanger bracket substantially connected to a door disposed within an aperture of the vehicle structure. Such drive nut further engaging a drive screw to move a door for covering and uncovering an aperture for ingress and egress of passengers in a wall of a transit vehicle upon rotation of the drive screw enabled by a rotary prime mover. The drive assembly comprises a housing having an internal cavity, at least one drive nut insert having a helix portion substantially identical to the drive screw helix and disposed within said internal cavity, and a retaining clip engaging said at least one drive nut insert for substantial retainment thereof. Retaining clip further provides for simple replacement of such at least one drive nut insert during maintenance cycles thereby substantially eliminating periodic lubrication generally employed with powered door operators of the prior art.

28 Claims, 6 Drawing Sheets

DRIVE NUT ASSEMBLY FOR A DOOR OPERATOR

CROSS-REFERENCE TO RELATED APPLICATIONS

This provisional application is related to the invention disclosed in U.S. Provisional Application Serial No. 60/288,843 filed on May 5, 2001 now abandoned. The teachings of that provisional application are incorporated into this document by reference thereto.

FIELD OF THE INVENTION

The present invention relates, in general, to powered apparatus utilizing a drive nut working in cooperation with the drive screw to move a load in a direction substantially parallel to the drive screw and, more particularly, the present invention relates to powered door operators for passenger transit vehicles utilizing drive screw and drive nut assemblies to move a door for covering and uncovering an aperture for ingress and egress of passengers in a wall of a transit vehicle.

BACKGROUND OF THE INVENTION

Drive screw and drive nut arrangements disposed within a powered apparatus move a load connected to the drive nut through a drive linkage in a predetermined direction, generally, substantially parallel to the axis of such drive screw. Lubricants are generally applied to the drive screw to minimize frictional forces and increase the working life of the drive nut, furthermore, the lubricants are selected and approved to work in a particular environment and work in cooperation with the particular materials of the drive screw and drive nut. Since the lubricant properties are altered during load movement, these lubricants are generally re-applied on a periodic time basis, generally preceded by removal of the old lubricant from the drive screw and drive nut. The re-lubrication effort may be time consuming and requires availability of the proper lubricants at the time of the effort. It is well known that unapproved lubricants have been used when the primary lubricants are not available. Examples of such apparatus generally include an apparatus for moving a spindle of metal cutting equipment, an apparatus for moving a work holding table of such metal cutting equipment, a powered apparatus for moving a door for covering and uncovering an aperture of a building and a powered door operators for passenger transit vehicles utilizing drive screw and drive nut assemblies to move a door for covering and uncovering an aperture for ingress and egress of passengers in a wall of a transit vehicle. The use of it in conjunction with the present invention will be explained as used in a particular application within a mass transit vehicle.

It is generally well known in the passenger transit vehicle art to employ a door drive mechanism which includes a drive screw engaging a drive nut that is attached to a transit vehicle door so that when the drive screw is rotated such drive nut is moved longitudinally along the drive screw in order to open and close the door. The drive nut is usually connected to the door panel or door panel hanger via an elaborate linkage to minimize the substantial force generated by offsetting the door drive and door hanger cavity.

U.S. Pat. No. 6,026,697 teaches a drive nut bracket for attaching a drive nut to a door panel in order to move the door panel in a drive direction. The drive nut is engaged with a drive screw which is aligned substantially parallel to the drive direction. When the drive nut moves as the drive screw is rotated the drive nut bracket provides rotational constraint, thus, preventing the drive nut from rotating about the axis of the drive screw. The drive nut bracket also provides linear constraint of the drive nut along the axis of the drive screw between the drive nut and the driven component. Rotation of the drive screw causes motion of the drive nut parallel to the axis of the drive screw and hence causes movement of the driven component in the drive direction.

In this arrangement the drive nut and drive screw arrangement is displaced from the door panel hanger in both the horizontal and vertical planes, thus increasing the space envelope needed for the entire door operator assembly. The physical displacement between the drive member and door panel hanger results in additional adjustments of the door panel with regards to motion transverse to the panel plane and hanger cavity axis and requires complex linkage to minimize loads being applied between the drive nut and the drive screw in directions perpendicular to such drive screw. This is particularly the case in a passenger transit vehicle which is not built to close dimensional tolerances and which may also undergo flexure due to a load of passengers.

U.S. Pat. No. 6,026,697 furthermore teaches a one-piece drive nut having a threaded bore for engagement with a drive screw to be driven thereby. A threaded bore is manufactured to close tolerances in order to provide proper fit between the drive nut and the drive screw.

It is well known in the art of the door operators for passenger transit vehicles employing a drive screw and drive, that the outer surface of the drive screw is coated with lubricants to reduce friction forces between the drive nut and drive screw due to close tolerances. During operation, the door operator and, more particularly, drive nut and drive screw interface is subjected to contamination which find access into the interior structure of the vehicle through the door panel interface with the car structure and various wire ducts carrying electrical wiring. As this contamination settles on the exterior surface of the drive screw it is attracted by the viscosity of the lubricant structure and impregnates and alters lubricant structure resulting in increased friction between the drive nut and drive screw and in additional loads acting on the drive screw. Furthermore, lubricants must be re-applied on a periodic basis thus increasing maintenance costs. Traditionally, application of the drive nut and drive screw without the use of lubricants result in drive nut wear requiring the replacement of such drive nut which necessitates significant disassembly of the door operator mechanism.

Prior art systems have a significant amount of mechanical backlash, which creates problems for the control of the doors and for the detection of obstructions between door panels.

As it can be seen from the above discussion it will be advantageous to minimize the displacement between the door panel hanger and the drive screw and resulting wear producing forces, improve door control, and eliminate the need for lubricants while minimizing replacement effort of the drive nut.

SUMMARY OF THE INVENTION

A powered door operator for passenger transit vehicles, having a drive nut assembly engaging a door hanger bracket substantially connected to a door disposed within an aperture of the vehicle structure. The drive nut further engaging a drive screw to move a door for covering and uncovering an aperture for ingress and egress of passengers in a wall of a transit vehicle upon rotation of such drive screw enabled by a rotary prime mover. The drive nut assembly comprises a housing having an internal cavity, at least one drive nut insert having a helix portion substantially identical to the drive screw helix and disposed within such internal cavity and a retaining clip engaging the at least one drive nut insert for substantial retainment thereof. The retaining clip further provides means for simple replacement of such at least one drive nut insert during maintenance cycles thereby substantially eliminating periodic lubrication of the drive screw. Such drive nut assembly further comprises spherical bushings attached to a force transmitting portions disposed within a drive nut housing and engaging force receiving portions disposed within such door hanger bracket. Means are provided to substantially minimize side loads acting on a drive screw due to drive rod bending and deflection during door motion. Further means are provided to compensate for shock and vibration acting on a drive screw and drive nut during door motion.

OBJECTS OF THE INEVENTION

It is, therefore, one of the primary objects of the present invention to provide a drive nut arrangement that substantially eliminates the need for lubricants to be applied to the outer surface of the drive screw.

It is a further object of the present invention to provide a drive nut arrangement that substantially minimizes door drive/door offsets and wear producing forces.

It is another object of the present invention to provide a drive nut arrangement that provides for ease of replacing worn components.

It is an additional object of the present invention to provide a drive nut arrangement that minimizes door operator maintenance cost.

It is yet another object of the present invention to provide a drive nut arrangement that substantially minimizes mechanical backlash.

In addition to the various objects and advantages of the present invention which have been generally described above, there will be various other objects and advantages of the invention that will become more readily apparent to those persons skilled in the relevant art from the following more detailed description of the invention, particularly, when the detailed description is taken in conjunction with the attached drawing figures and with the appended claims.

DETAILED DESCRIPTION OF VARIOUS EMBODIMENTS OF THE INVENTION

Figure 1:
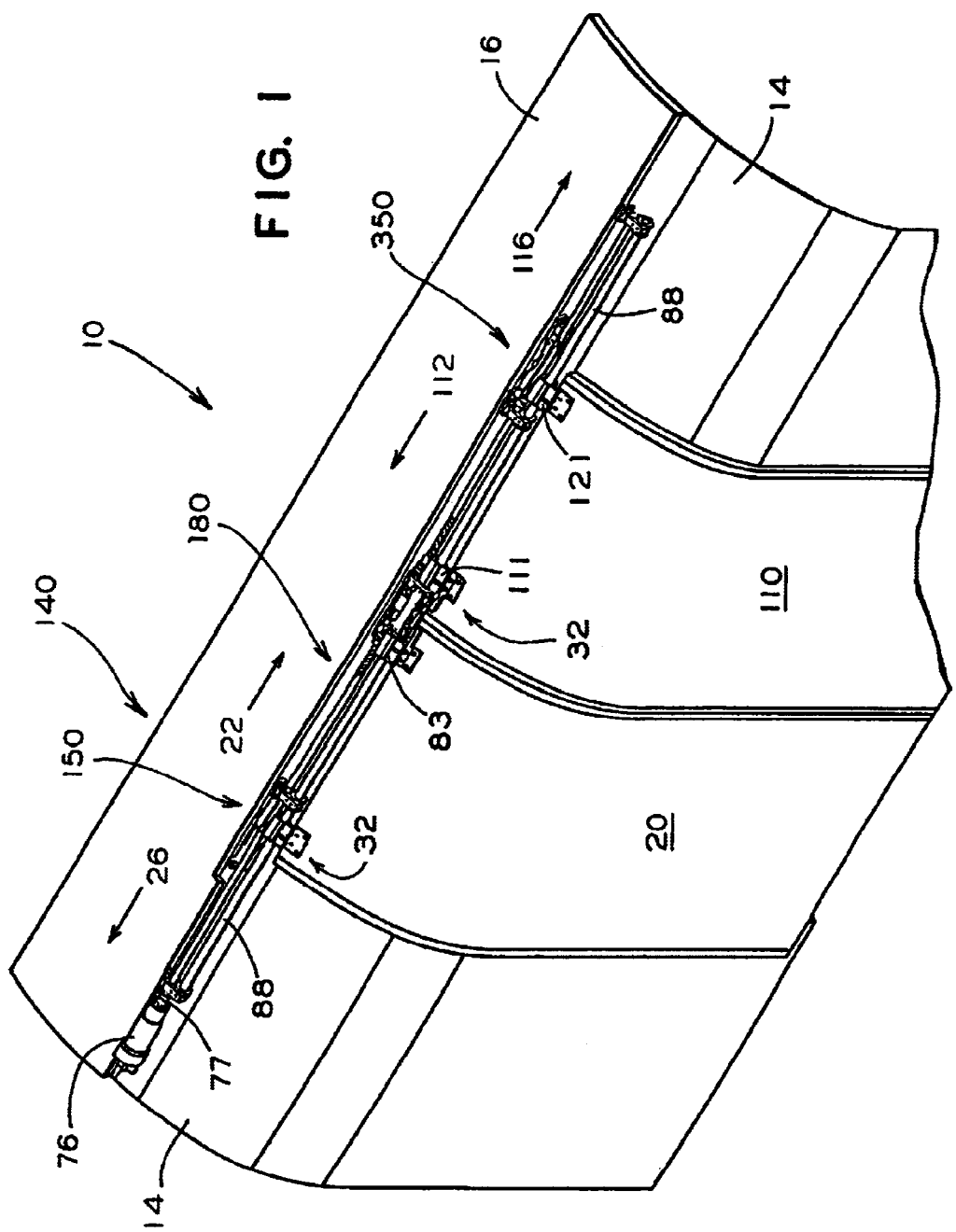
FIG. 1 is a partial perspective view of the typical transit vehicle, particularly showing the location of the drive nut assembly of the present invention.

Prior to proceeding with the more detailed description of the invention, it should be noted that for the sake of clarity, identical components which have identical functions have been identified with identical reference numerals throughout the several views illustrated in the attached drawing figures.

FIG. 1 shows a transit vehicle door system, generally designated 10, for covering and uncovering an aperture 12 for ingress and egress of passengers in a wall 14 of a transit vehicle 16. The door system 10 has a first door 20 mounted for movement in a first door closing direction 22 to a first door closed position at least partially covering aperture 12 and for movement in a first door opening direction 26 to a first door open position at least partially uncovering aperture 12, the first door opening direction 26 being opposite to the first door closing direction 22. Such door system 10 further has a door operator, generally indicated 140, connected to the first door 20 for moving first door 20 to the first door closed position and for moving first door 20 to the first door open position.

Door system 10 also has a second door 110 for longitudinal movement opposite to the first door 20, the second door 110 moving in a second door closing direction 112 to a second door closed position at least partially covering aperture 12 when first door 20 moves in the first door closing direction 22, and second door 110 moving in a second door opening direction 116 to a second door open position at least partially uncovering aperture 12 when first door 20 moves in the first door opening direction 26. The second door closing direction 112 is generally opposite to the first door closing direction 22 and the second door opening direction 116 is generally opposite to the first door opening direction 26. Hence, the first door 20 and the second door 110 cooperate to cover and uncover the aperture 12.

In further reference to FIG. 1, door operator 140 includes a drive member, generally designated 80, substantially rotatably mounted using a drive motor 76, as a rotary electric prime mover, and a coupling 77 at one end. In the presently preferred embodiment, the drive member 80 is a helical drive screw having an outer diameter 84 and a plurality of substantially parallel helix surfaces 82. A drive nut assembly, generally designated 150, engages such helical drive member 80 to be driven thereby upon rotation of such helical drive member 80 enabled by the electric rotary prime mover 76. Additionally, drive nut assembly 150 engages a door hanger bracket, generally designated 32, substantially connected to said first door 20, for driving the first door 20 in directions 26 and 22.

A drive nut, generally designated 350, engages door hanger bracket 32, substantially connected to such second door 110, for driving the first door 110 in directions 112 and 116. The drive nut assemblies 150 and 160 are essentially mirror images of each other. Therefore, only drive nut assembly 150 is described hereinafter.

Figure 2:
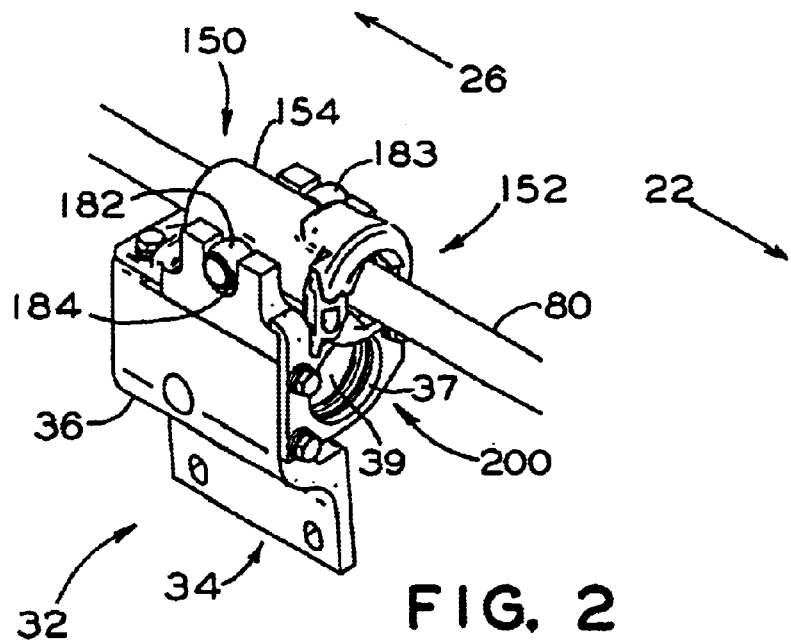
FIG. 2 is a perspective view of the presently preferred drive nut assembly of the present invention.
Figure 3:
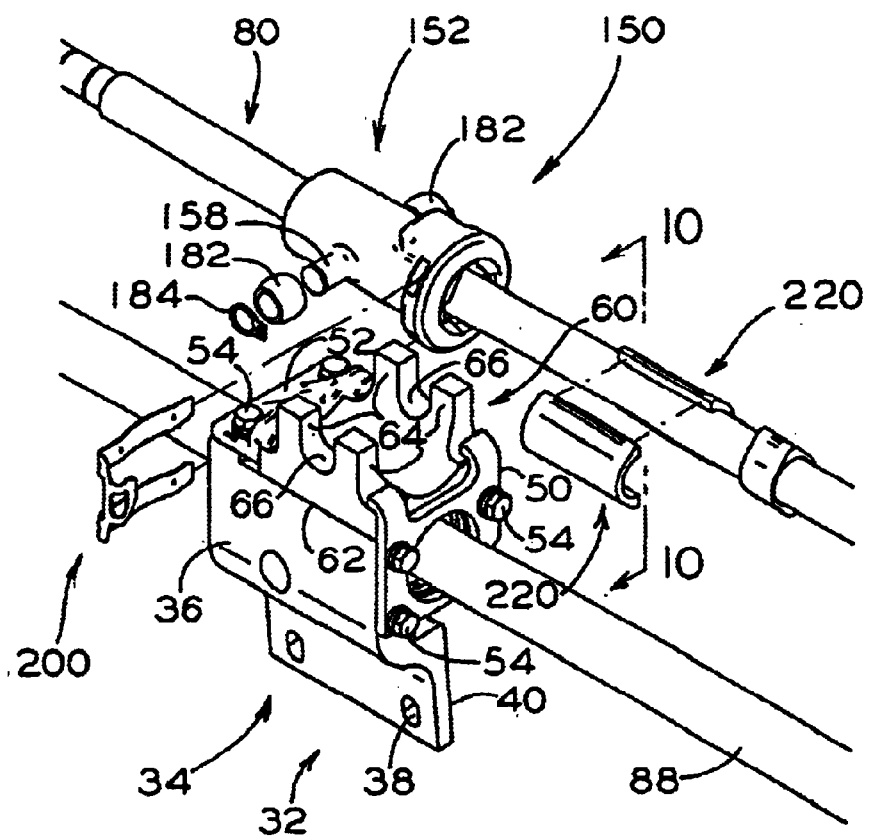
FIG. 3 is a perspective view of the presently preferred drive nut assembly of the present invention, in exploded form, particularly showing a method by which components can be attached.

In reference to FIGS. 2 and 3, there is shown a drive nut assembly 150 substantially engaging door hanger bracket assembly 32 collared around door hanger 88 for transposing rotary motion of the drive screw 80 into a linear motion of the door 20 in the directions 22 and 26. As it can be best seen in FIG. 2, such drive nut assembly 150 is substantially aligned in a vertical plane with the door bracket assembly 32 substantially minimizing the offset between drive screw 80 and a door hanger rod 88 and, more particularly, substantially minimizing the wear producing forces. Such door hanger bracket assembly 32 comprises a door hanger bracket, generally designated 34, having a bearing housing portion 36, a bearing cavity 37, a door mounting portion 40 at least one door mounting cavity 38 for attachment to the door, and a top portion (not shown). At least one bearing means are disposed within such bearing cavity 39. In the preferred embodiment the bearing means comprise a well-known recirculating ball linear bearing type. Alternatively, the bearing means may comprise a drive linkage assembly, wherein the bearing means comprise a well-known linear bushing manufactured out of low friction material, a well-known ball bearing type, or a coating having substantially low friction properties applied to the bearing cavity.

Such door hanger bracket assembly 32 further comprises a drive nut bracket, generally designated 60, engaging the top portion (not shown) for further engagement with the drive nut assembly 150 and, more particularly, for transferring linear motion of the drive nut assembly 150 to the door 20 via a door hanger bracket assembly 32. The drive nut bracket 60 having at least one drive nut mounting cavity 66 disposed intermediate a plurality of the force receiving portions 64 substantially secured to the door hanger bracket 34 with a first retaining bracket 50 and a second retaining bracket 52 and a plurality of simple threaded fasteners 54 engaging threaded cavities {not shown) disposed within door hanger bracket 34.

Figure 4:
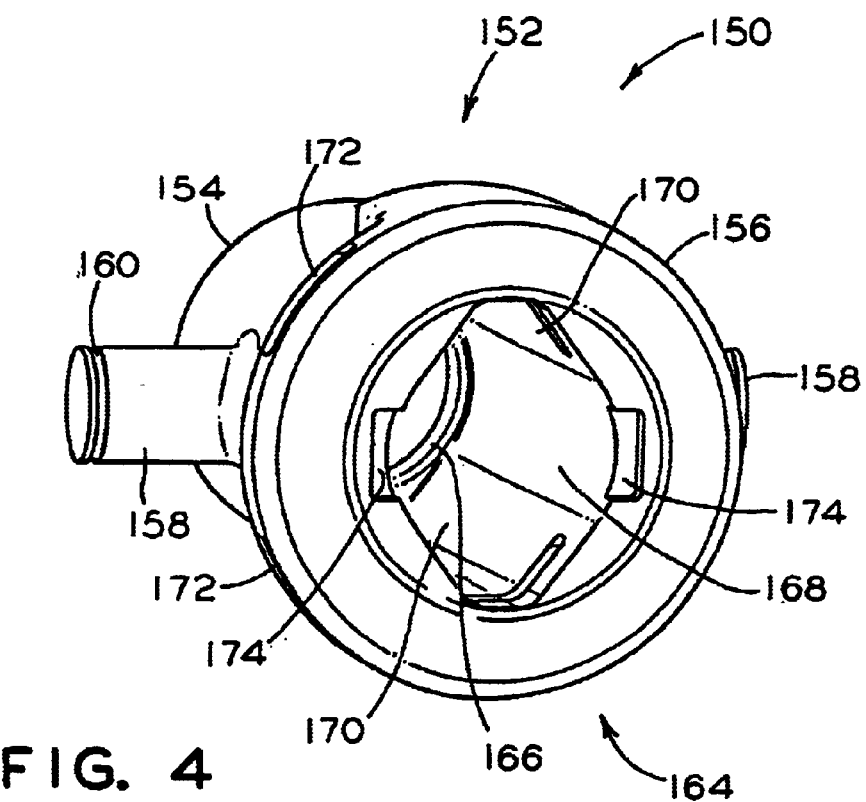
FIG. 4 is a front perspective view of the drive nut.
Figure 5:
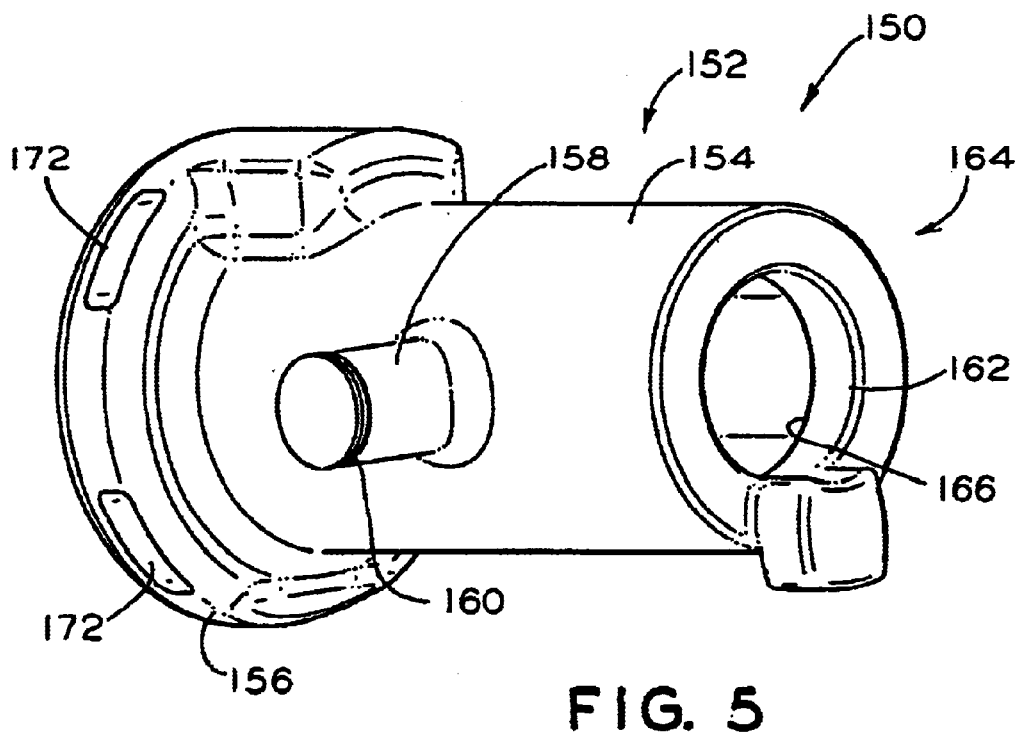
FIG. 5 is a side perspective view of the drive nut.
Figure 8:
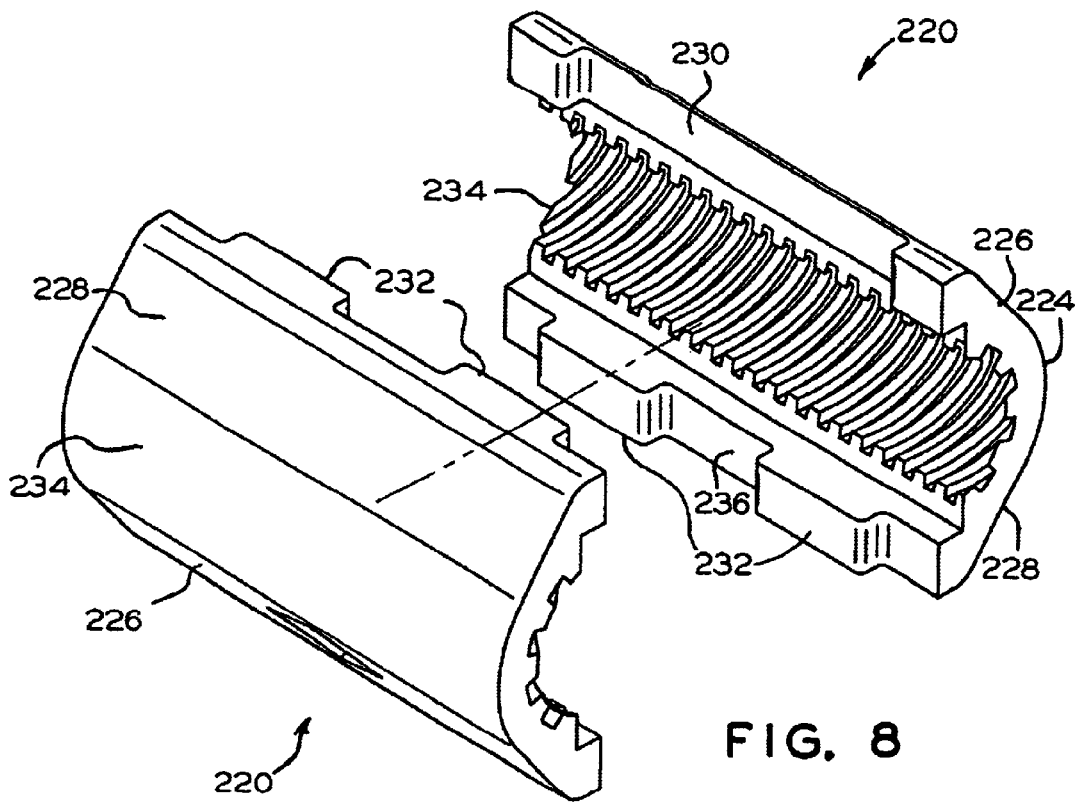
FIG. 8 is a perspective view of the drive nut threaded insert of the present invention.
Figure 9:
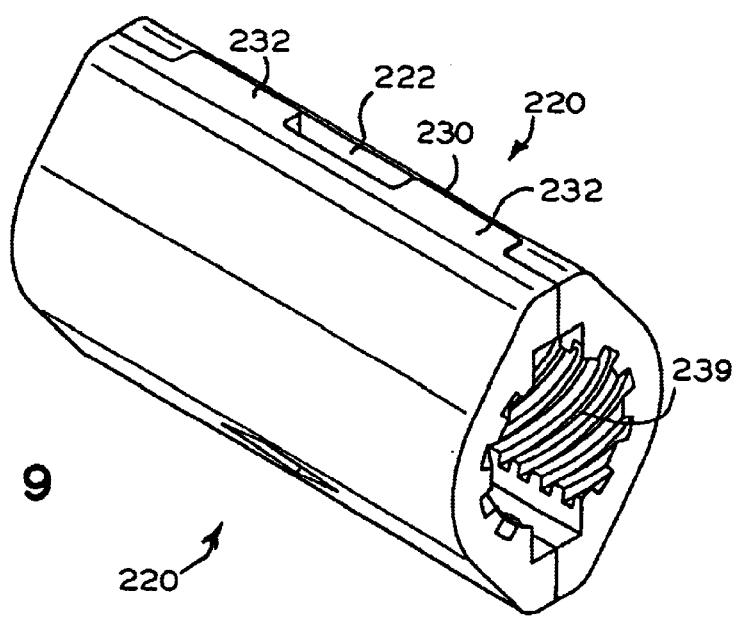
FIG. 9 is a perspective view of drive nut inserts of the present invention, particularly showing their disposition within the drive nut housing assembly.

In further reference to FIGS. 2 and 3, drive nut assembly 150 comprises drive nut housing, generally designated 152, having at least two force transmitting portions 158 disposed substantially symmetrically on each side of the first portion 154 of drive nut housing 152, best shown in FIGS. 4 and 5, and at least one drive nut insert 220, best shown in FIGS. 8 and 9, normally disposed within the drive nut housing 152. In the preferred embodiment, the at least one drive nut insert 220 is two threaded nut inserts 220 disposed substantially opposite each other for forming a threaded helix cavity 239 substantially identical to the helix of the drive screw 80 for motion communication during door 20 travel. Drive nut assembly 150 further comprises at least two spherical bushings 182 having a substantially convex outer surface and engaging the force transmitting portions 158 and substantially retained with well-known retaining clips 184. Such spherical bushings 182 are disposed within drive nut mounting cavities 66 and engage force receiving portions 64 during door 20 motion in the directions 22 and 26.

In reference to FIGS. 4 and 5, there is shown in perspective views the drive nut housing 152 comprising a first housing portion 154 and a second housing portion 156 substantially concentric to said first housing portion 154. A first internal cavity 162 is disposed within such first housing portion 154. A second internal cavity of a predetermined length, generally designated 164, for working in communication with the drive nut inserts 220 is disposed within first housing portion 154 and a second housing portion 156 and engages a first internal cavity 162 at a wall portion 166. Such second internal cavity 164 comprises at least one concave portion 168 disposed intermediate flat portions 170. In the preferred embodiment the at least one concave portion 168 is two concave portions 168 disposed substantially symmetrical with each other within second internal cavity 164. At lease one cavity 172 is disposed within second housing portion 156 and at least one cavity 174 is disposed within second internal cavity 164 for communication with the retaining clip 200. In the preferred embodiment such at least one cavity 172 is four cavities 172 substantially equally disposed within the outer surface of the second housing portion 156 and at least one cavity 174 is two cavities 174 substantially symmetrical with each other within second internal cavity 164.

Figure 6:
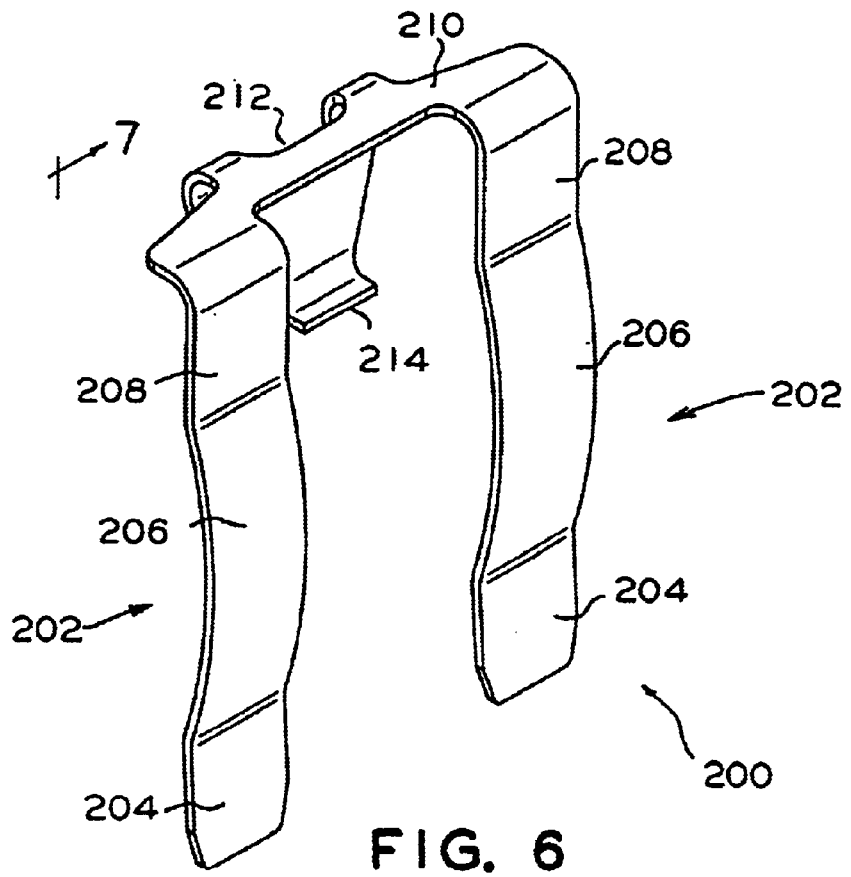
FIG. 6 is a perspective view of the drive nut retaining clip of the present invention.
Figure 7:
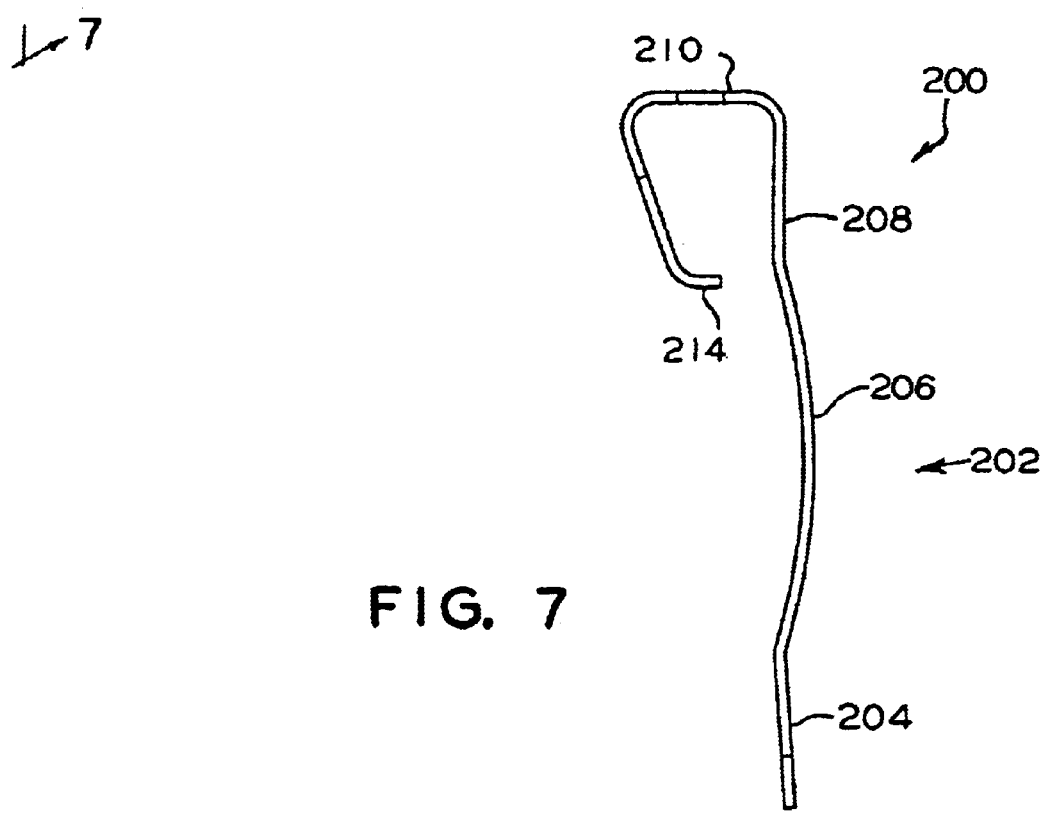
FIG. 7 is the side view of the retaining clip in FIG. 6, along the lines 7—7.

The final element of the drive nut assembly 150 is a means to substantially retain the threaded insert 220 within internal cavity 164. In the preferred embodiment such means comprise a plurality of cavities 172 and a retaining cavity 172 disposed within drive nut housing 152 and a retaining clip, generally designated 200, best shown in FIGS. 6 and 7. Alternatively, such means may comprise attachment of the retaining clip 220 to the drive nut housing 152 with well known threaded fasteners, or use of the well known wave washer.

The retaining clip 200 comprises at least one drive nut insert retaining portion, generally designated 202, a main portion 210 having a means 212 for simple removal and installation of such retaining clip 200 within drive nut assembly 150 and at least one attachment portion 214 for engagement with the cavity 174 disposed within second internal cavity 164. In the preferred embodiment the at least one drive nut insert retaining portion 202 is a two threaded insert retaining portion 202 substantially parallel to each other and disposed at each end of the main portion 210. Furthermore, in the preferred embodiment such means 212 is a simple cavity disposed within the main portion 210 for insertion of a well-known screwdriver or long nose pliers. Alternatively, main portion 210 may include an outwardly disposed surface portion for engagement with well-known pliers. Drive nut insert retaining portion 202 further contains at least one concave retaining portion 206 for engagement with the drive nut insert 220 disposed intermediate first locating portion 204 and second locating portion 208. Such locating portions 204 and 208 are for engagement with the cavities 172 disposed within the outer surface of the second housing portion 156. Means are provided to deflect concave retaining portion 206 during assembly into drive nut assembly 150 to substantially eliminate lateral travel of the drive nut insert 200 within drive nut housing 152 and, more particularly, substantially minimize backlash of the drive nut assembly 150. In the preferred embodiment such means comprise a well known tempered spring steel material utilized in the manufacturing of the retaining clip 200. Alternatively this means may include other materials having similar flexing properties such as engineered polymers, use of the well known wave washer as shown in FIG. 11 or use of well known shims to substantially eliminate lateral clearances between drive nut insert 220 and internal cavity 164 due to the design and manufacturing tolerances.

Figure 11:
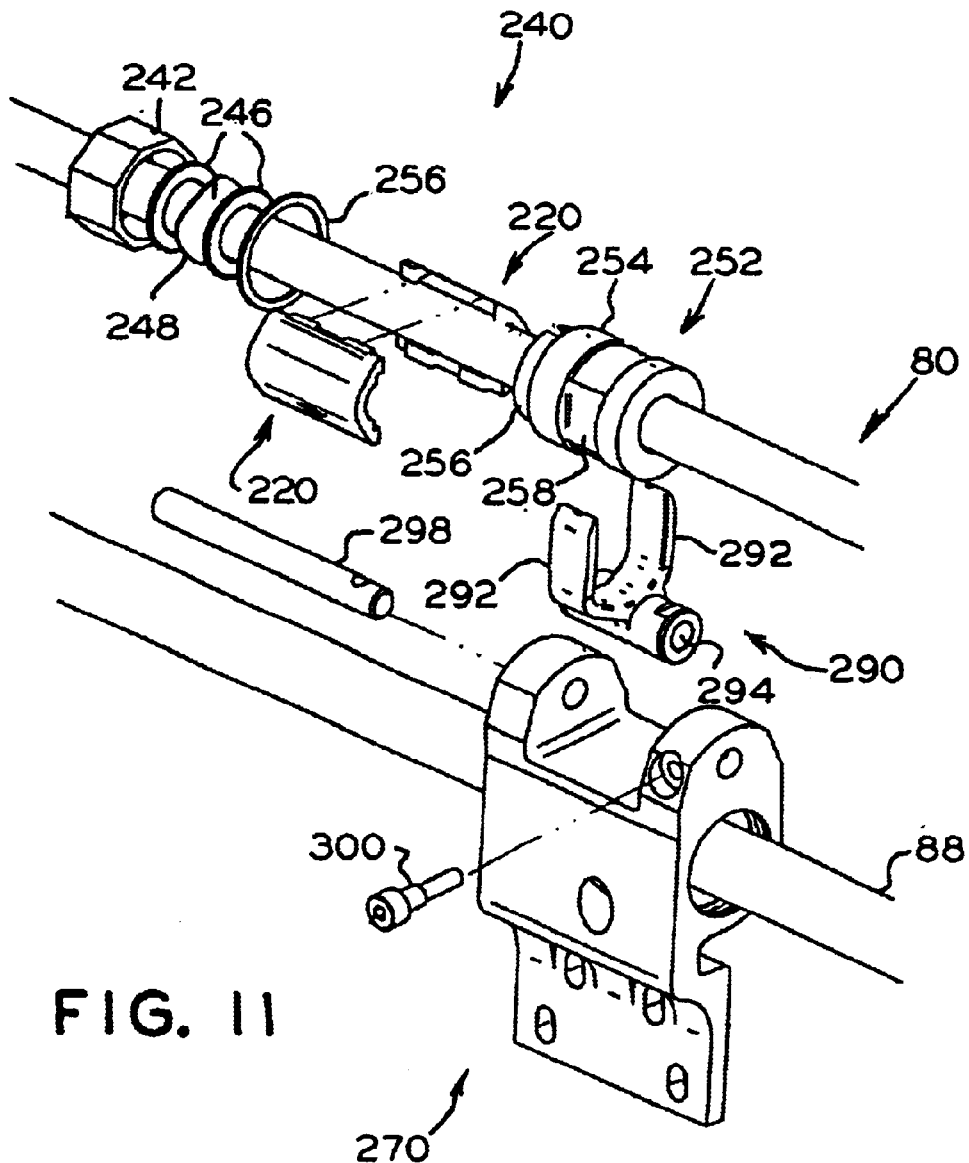
FIG. 11 is a perspective view of an alternative drive nut assembly of the present invention, in exploded form, particularly showing method of attaching components.

Alternative retainment of the at least one drive nut insert is shown in FIG. 11. A drive nut assembly, generally designated 240, comprises a drive nut housing, generally designated 252, at least one drive nut insert 220, a well known wave washer 248 disposed intermediate the well known flat washers 246, lock washer 250 and a drive nut cap 242, having an internal threaded cavity. Drive nut housing 252 further comprises a main portion 254 having a force transmitting surface 258 for engagement with the force receiving portions 292 disposed within fork 290, a threaded portion 256, and a cavity (not shown) substantially identical to the cavity 164, best shown in FIG. 4. At least one drive nut insert 220 is disposed within the internal cavity (not shown) of the drive nut assembly 270 and retained by a combination of wave washer 248 and flat washers 246 upon substantial engagement of the drive nut cap 242 with a threaded portion 256.

Fork 290 is substantially attached to door bracket 270 with a retaining pin 298 and a threaded fastener 300 for motion of door 20 in directions 22 and 26.

As shown in FIGS. 8 and 9, drive nut insert 220 comprises a convex outer portion 224 disposed intermediate first flat portions 226 and second locating portion 228, and a threaded helix cavity 234. Drive nut insert 220 further comprises a first locating portion 230 disposed within first flat portion and at least one second locating portion 232 disposed within second flat portion 228. In the preferred embodiment, the at least one second locating portion 232 is two second locating portions 232 disposed at each end of cavity 236. Such first and second locating portions form at least one cavity 222, best shown in FIG. 9, during the assembly into drive nut housing 152 for disengagement of such drive nut inserts 220 from the drive screw 80 for maintenance purposes.

Figure 10:
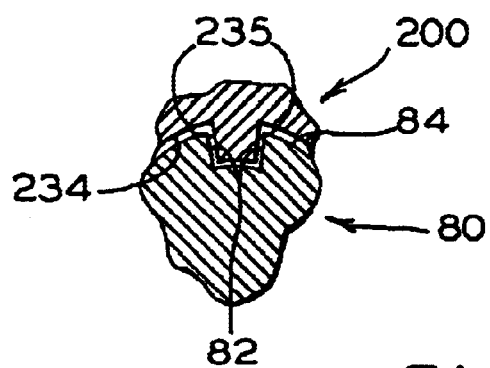
FIG. 10 is a partial cross-sectional view of the drive screw and treaded insert helix along lines 10—10 in FIG. 3.

As it can be seen further in FIG. 10, helix cavity 234 having a plurality of substantially parallel force receiving helix portions 235 engages substantially parallel force transmitting helix surfaces 82 disposed within drive screw 80. Means are provided to allow for thermal expansion and contraction of drive nut insert 220 without binding with drive screw 80 during door 20 motion in direction 22 and 26. In the preferred embodiment such means comprise predetermined clearances between surfaces 82 and 235. Furthermore, means are provided to substantially retain drive nut insert 220 upon engagement with drive screw 80 prior to insertion of the threaded nut 220 into the internal cavity 164 disposed within drive nut housing 152. In the preferred embodiment such means comprise a predetermined diameter 238 of the helix cavity 234 which is smaller than the predetermined diameter 84 of the drive screw 80 and material properties of the drive nut insert 220 allowing flexing thereof upon engagement with such drive screw 80.

During an assembly of the threaded inserts 220 into drive nut housing 152, first and second locating surfaces 226 and 228, respectively, engage locating surfaces 170 of the drive nut housing 152 and convex surface 224 of the drive nut insert 220 engages concave surface 168 of the drive nut housing 152. Means are provided to substantially minimize rotation of the drive nut insert 220 within internal cavity 164 of the drive nut housing 152 and allow conversion of the rotational forces generated by the prime electric mover 76 and transmitted by the drive screw 80 into linear motion of the drive nut assembly 150. In the preferred embodiment, such means comprise substantially identical corresponding engaging surfaces of drive nut insert 220 and internal cavity 164, respectively. Alternatively, the anti-rotational means can comprise a well known method of utilizing a key and slot arrangement or use of well known threaded fasteners, such as set screws. Furthermore, means are provide to allow for thermal expansion and contraction of the drive nut insert 220 without substantially increasing friction forces on drive screw 80 during door 20 motion in directions 22 and 26. In the preferred embodiment such means include predetermined clearances between corresponding engaging surfaces of drive nut insert 220 and internal cavity 164 respectively.

Additionally, means are provided to substantially eliminate the need for external lubrication. These means comprise drive nut insert 220 manufactured of a carbon fiber reinforced PTFE/Silicone lubricated acetal engaging the stainless steel drive screw 80.

As it can be seen form the above discussion, the drive nut 150 of the instant invention overcomes various disadvantages of the traditional drive nuts. Not requiring external lubrication, the drive nut assembly 150 does not attract dirt and can work in harsh dusty and wet environments and throughout a wide range of temperatures. Furthermore, such drive nut assembly 150 can even be mounted outside the passenger transit vehicle.

Application of the aforementioned retaining methods allow for simple field replacement of the drive nut inserts 220 for maintenance purpose without the use of special tools. Removal of the retaining clip 200 requires the use of the long nose type pliers engaging cavity 212 with subsequent disengagement of the attachment portion 214 from the cavity 174 disposed within drive nut housing 152. Further disengagement of the retaining portions 202 form the retaining cavities 172 disposed within drive nut housing 152 allows to move door 20 in the direction 22 and disengage drive nut inserts 220 from the cavity 164 disposed within drive nut housing 152. Insertion of the well-know flat-ended screwdriver into cavity 222 disposed between such drive nut inserts 220 and further rotation of the screwdriver in either clockwise or counterclockwise direction disengages such drive nut inserts form the drive screw 80. Installation of the new drive nut inserts 220 involves engaging the drive nut inserts onto the drive screw in a snapping action, moving the door in the direction 26 to dispose such drive nut inserts 220 within cavity 164 and reinstall retaining clip 200. Such removal and reinstallation procedure is completed in a substantially short duration of time. Removal of the spherical bushings 182 is accomplished by removal of the threaded fasteners 54 and first retaining bracket 50 and allowing for drive nut bracket 60 disengagement form the door hanger bracket housing 34 and further allowing to temporarily discard the door hanger bracket housing 34, remove retaining rings 184 and disengage the spherical bushings 182 from the force transmitting portions 160 disposed within drive nut housing 152. Reinstallation of said spherical bushings 182 is achieved by the reverse procedure.

The drive nut assembly 150 transmits forces to the hanger bracket 32 through spherical bushings 182 engaging force receiving portions 64 during motion of the door 20 in directions 22 and 26. Means are provided to substantially minimize wear producing loads caused by drive rod 88 deflection and bending in the vertical plain caused by the weight of door 20 from acting on drive screw 80. In the preferred embodiments the means comprise cavities 66 disposed within drive nut bracket 60 allowing for spherical bushings 162 to move vertically within said cavities 66.

Additionally, means are provided to substantially minimize side load acting on the drive nut 150 due to the car body deflection, misalignments and manufacturing tolerances. In the preferred embodiment such means comprise spherical bushings 182 having a substantially concave outer surface to allow rotation and skewing of the drive nut assembly 150 and further alignment in respect to drive screw 80. Alternatively, substantially concave surfaces may be disposed within force receiving portions 64 adjacent cavities 66.

Furthermore, means are provided to absorb shock and vibration and to substantially minimize generated noise during door 20 motion. In the preferred embodiment such means comprise spherical bushing 182 manufactured from a well known rubberized Dextron material. Alternative means of absorbing shock and vibration and of substantially minimizing noise during door 20 motion may include coating of the cavities 66 disposed within drive nut bracket 60 the same Dextron material or with other engineered polymers such as Teflon.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art of transit vehicle drive nuts without departing from the spirit and scope of the invention as set forth in the appended claims.

I claim:

1. A drive nut assembly engaged with a drive screw in order to be driven thereby in a linear direction upon rotation of said drive screw by a prime mover, said drive nut assembly comprising:

(a) a drive nut housing having a cavity disposed therein;
    (b) at least one drive nut insert disposed within said cavity, said at least one drive nut insert substantially engaging a threaded helix of said drive screw for transferring rotary motion of said drive screw to said drive nut assembly;
    (c) a means engageable with said at least one drive nut insert for substantially retaining said at least one drive nut insert within said cavity disposed within said drive nut housing;
    (d) a means engageable with said prime mover for transferring a force generated by said prime mover to a drive linkage;
    (e) a means engageable with said drive nut assembly for substantially minimizing backlash within said drive nut assembly;
    (f) a means engageable with said drive screw and said at least one drive nut insert for compensating for thermal expansion and contraction of said at least one drive nut insert without binding with said drive screw during door motion;
    (g) a means engageable with said at least one drive nut insert for substantially minimizing rotation of said at least one drive nut insert within said cavity disposed within said drive nut housing; and
    (h) a means engageable with said drive screw for substantially eliminating external lubrication of said drive screw.

2. A drive nut assembly according to claim 1, wherein said drive nut assembly includes two substantially identical drive nut inserts disposed substantially opposite each other for forming a threaded helix cavity substantially identical to said threaded helix of said drive screw.

3. A drive nut assembly according to claim 1, wherein said at least one drive nut insert includes means for substantially retaining said at least one drive nut insert upon engagement with said drive screw.

4. A drive nut assembly according to claim 3, wherein said means for substantially retaining said at least one drive nut insert upon engagement with said drive screw is a predetermined diameter of a helix cavity disposed within said drive nut insert allowing flexing thereof upon engagement with said drive screw.

5. A drive nut assembly according to claim 1, wherein said means for substantially retaining said at least one drive nut insert within said drive nut housing includes:

(a) at least one cavity disposed within a second housing portion for engagement with said at least one drive nut insert retaining means;
    (b) a retaining clip having at least one locating portion engaged with said cavity disposed in said second housing portion, said retaining clip further having at least one retaining portion substantially engaged with said at least one drive nut insert.

6. A drive nut assembly according to claim 1, wherein said means for substantially retaining said at least one drive nut insert within said drive nut housing includes treaded fasteners for substantial attachment of said retaining means to said drive nut housing.

7. A drive nut assembly according to claim 1, wherein said means for substantially retaining said at least one drive nut insert within said drive nut housing includes:

(a) a threaded portion;
    (b) a drive nut cap having a threaded portion substantially identical to said threaded portion disposed within said drive nut housing for substantial attachment thereto; and
    (c) a wave washer in combination with at least one flat washer disposed with a drive nut cavity and engaging said at least one nut insert.

8. A drive nut assembly according to claim 1, wherein said means to substantially minimize rotation of said at least one drive nut insert within said cavity disposed within said drive nut housing includes substantially identical corresponding engaging surfaces of said at least one drive nut insert and said cavity disposed within said drive nut housing.

9. A drive nut assembly according to claim 1, wherein said means to substantially compensate for thermal expansion and contraction of said at least one drive nut insert without binding with said drive screw during door motion includes a predetermined clearance between substantially identical corresponding engaging surfaces of said at least one drive nut insert and said cavity disposed within drive nut housing.

10. A drive nut assembly according to claim 1, wherein said means to substantially eliminate external lubrication of said drive screw includes manufacturing said at least one threaded insert from a carbon fiber reinforced PTFE lubricated acetal material.

11. A drive nut assembly according to claim 1, wherein said means for transferring force generated by said prime mover to said drive linkage includes:

(a) at least two spherical bushings having a substantially outer surface; and
    (b) a force transmitting portion disposed within said drive nut housing.

12. A drive nut assembly according to claim 1, wherein said means engageable with said at least one drive nut insert for substantially retaining said at least one drive nut insert within said drive nut housing is a retaining clip, said retaining clip further includes a means for removal and installation thereof.

13. A drive nut assembly according to claim 12, wherein said means for removal and installation of said retaining clip includes a cavity disposed within said retaining clip for insertion of a screwdriver.

14. A drive nut assembly according to claim 13, wherein said means for removal and installation of said retaining clip includes an outwardly disposed surface portion for engagement with a pliers.

15. A drive nut assembly according to claim 12, wherein said means for removal and installation of said retaining clip includes an outwardly disposed surface portion for engagement with a pliers.

16. A drive nut assembly according to claim 12, wherein said means to substantially minimize backlash within said drive nut assembly includes manufacturing said retaining clip from spring steel material tampered to a predetermined strength.

17. A drive nut assembly according to claim 12, wherein said means to substantially minimize backlash within said drive nut assembly includes manufacturing said retaining clip from an engineered polymer having substantially similar flexing properties of spring steel material.

18. A drive nut assembly according to claim 1, wherein said means to substantially minimize backlash within said drive nut assembly includes at least one shim member disposed within said cavity of said drive nut housing, said shim member engaging said at least one threaded insert.

19. A drive linkage assembly comprising:
(a) a drive linkage housing having a bearing cavity for engagement with bearing means and further having at least one door mounting cavity for attachment to a door;
(b) a drive nut bracket engaging said drive linkage housing at one end and further engaging a drive nut assembly at a distal end;
(c) a first retaining bracket substantially attached to said drive linkage housing with threaded fasteners, said first retaining bracket engaging said drive nut bracket for substantial retainment thereof within said drive linkage assembly;
(d) a second retaining bracket substantially attached to said drive linkage housing with threaded fasteners, said second retaining bracket engaging said drive nut bracket for substantial retainment thereof within said drive linkage assembly.

20. A drive linkage assembly, according to claim 19, wherein said bearing means includes a recirculating ball linear bearing.

21. A drive linkage assembly, according to claim 19, wherein said bearing means includes a linear bushing.

22. A drive linkage assembly, according to claim 19, wherein said bearing means includes ball bearings.

23. A drive linkage assembly, according to claim 19, wherein said bearing means include a coating with substantially low friction properties applied to said bearing cavity.

24. A drive linkage assembly according to claim 19, wherein said drive linkage assembly includes a means for receiving a force generated by a prime mover, said force being transmitted by a force transmitting means disposed within drive nut assembly includes:
(a) a force receiving portion disposed with a drive nut linkage; and
(b) a drive nut mounting cavity disposed within said drive linkage assembly.

25. A powered door operator substantially attached to a door for moving said door to cover and uncover an aperture of a transit passenger vehicle, said door operator comprising:
(a) a prime mover;
(b) a drive screw attached to said prime mover;
(c) a drive nut assembly engaged with a drive screw in order to be driven thereby in a linear direction upon rotation of said drive screw enabled by said prime mover;
(d) a door hanger bracket assembly collared around a drive rod, said door hanger bracket assembly connected to said door for driving said door in a drive direction upon rotation of said drive screw, said drive screw being aligned substantially parallel to such drive direction, said door hanger bracket assembly providing rotational constraint in order to prevent a drive nut from rotating about an axis of said drive screw, said door hanger bracket assembly, further providing linear constraint of said drive nut along such axis of said drive screw between said drive nut and such driven component so that rotation of said drive screw causing motion of said drive nut parallel to such axis of said drive screw causes movement of said driven component parallel to such drive direction;
(e) a means compensating for wear producing loads caused by deflection and bending of a drive rod; and
(f) a means for compensating for shock and vibration during door motion.

26. A powered door operator according to claim 25, wherein said door hanger bracket assembly includes:
(a) a door hanger housing having a bearing cavity for engagement with a bearing means and further having at least one door mounting cavity for attachment to said door;
(b) a drive nut bracket engaging said door hanger housing at one end and further engaging said drive nut assembly at a distal end;
(c) a first retaining bracket attached to said door hanger housing, said first retaining bracket engaging said drive nut bracket for retainment thereof within said door hanger housing; and
(d) a second retaining bracket attached to said door hanger housing, said second retaining bracket engaging said drive nut bracket for substantial retainment thereof within said door hanger housing.

27. A powered door operator according to claim 25, further including a means for receiving force generated by said prime mover and being transmitted by a force transmitting means disposed within drive nut assembly includes:
(a) a force receiving portion disposed within a drive nut mounting bracket; and
(b) a drive nut mounting cavity disposed within said deer drive nut mounting bracket.

28. A powered door operator according to claim 25, wherein said drive nut assembly directly engages said door hanger bracket assembly.

* * * * *